Feb. 1, 1955  A. F. HOLDEN  2,701,269
ELECTRIC SALT BATH FURNACE AND ELECTRODE
Filed July 15, 1952

INVENTOR
Artemas F. Holden
BY
Ramsey, Chisholm & Hill
ATTORNEYS

United States Patent Office 2,701,269
Patented Feb. 1, 1955

2,701,269

ELECTRIC SALT BATH FURNACE AND ELECTRODE

Artemas F. Holden, Milford, Mich.

Application July 15, 1952, Serial No. 298,918

11 Claims. (Cl. 13—23)

This invention relates to an electrode type of electrical salt bath furnace in which a molten salt bath contained within a refractory ceramic pot is heated by electric current passed through the bath between two or more electrodes immersed therein. Such furnaces are widely used in the heat treating or case hardening of metal parts.

It is usual in salt bath furnaces of this type to locate the electrodes adjacent the periphery of the furnace pot so as to leave an unobstructed working area centrally of the pot for receiving work to be treated. The work may be supported on hangers or in wire baskets immersed in the salt bath.

Heating of the salt bath does not occur uniformly throughout the pot, heating taking place principally adjacent the electrodes and causing convection currents to maintain the entire bath at a more or less uniform temperature except adjacent the electrodes. Generally, substantially all of the current flowing between two electrodes flows only through the salt bath; but, if metal parts to be treated, baskets, or hangers are immersed within the bath too close to the electrodes so as to offer a path of less electrical resistance to flow of the current, local heating of the parts concerned and of the surrounding bath will occur so as to improperly heat treat or burn the parts. At times, the metal parts may be positioned so close to the electrodes as to create an actual short circuit, severely burning the parts and the electrodes. Either condition will more or less unbalance the power load of the furnace.

In the furnace of the present invention, each pair of electrodes is received within a recess in the pot wall or lining extending into the wall from the working area of the pot, the electrodes being set back somewhat from the general face of the pot wall. Preferably, the side towards the working area of the pot of at least one electrode of each pair is covered by the pot wall. In such a construction, unequal heating of the work and accidental short circuiting of the electrodes is almost completely prevented, thus providing a furnace having superior heating characteristics.

Preferably, the electrodes are introduced through the side wall of the furnace pot from the top edge thereof. In such a construction, there is no problem of sealing the side wall of the furnace against leakage along the electrodes, and the furnace side wall prevents accidental contact of the work with the electrodes and also reduces the surface area of the bath exposed to the atmosphere and thereby reduces heat loss from the furnace and breakdown of the salts due to contact with the atmosphere.

An object of the present invention is to provide an electrode-type electric salt bath furnace in which the work will be more evenly heated, in which short circuiting of electrodes by the work is prevented, in which heat losses from the furnace are minimized, to provide an economical and dependable furnace of simplified construction, and to generally improvide furnaces of this type.

Further objects and objects relating to details and economies of manufacture and use will more definitely appear from the detailed description to follow.

My invention is clearly defined in the appended claims. In the claims, as well as in the description, parts are at times identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Figure 1:
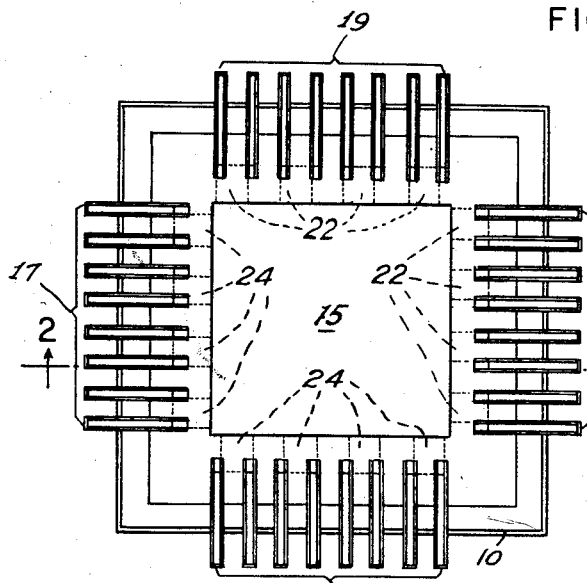
Fig. 1 is a top plan view of a furnace according to the present invention.
Figure 4:
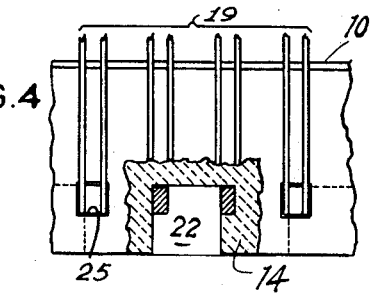
Fig. 4 is an enlarged fragmentary cross section of one pair of electrodes and the adjacent portion of the furnace structure.
Figure 2:
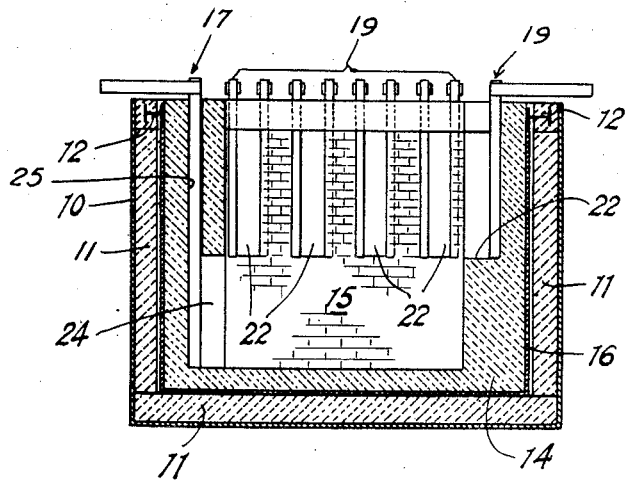
Fig. 2 is a vertical section of the furnace, taken on the line 2—2 of Fig. 1.

Referring now to Figs. 1, 2, and 4, the furnace includes a furnace shell 10 having sides and a bottom, the shell preferably being rectangular in horizontal section and formed of heavy gauge sheet steel. The shell 10 is lined with a layer of refractory heat-insulating material 11 which for clarity of illustration is shown as one integral structure although it may be made up of an outer layer of rammed refractory material and an inner layer of refractory brick. The upper marginal edge of the refractory layer 11 may have a reinforcing I beam 12 imbedded therein.

A refractory brick lining 14 contained within the shell 10 defines the bottom and side walls of a pot 15 which is adapted to contain molten salt for the heat treatment of metal parts. Preferably, the lining 14 is separated from the refractory layer 11 by a pot shell 16 formed of heavy gauge sheet steel so as to intercept any molten salt which may flow outward through cracks occurring in the lining 14 so as to prevent hot spots on the outer shell 10 of the furnace. Preferably, there is slight air space between the shell 16 and the refractory layer 11 to permit removal and replacement of the shell 16 and lining 17 as required.

The general planes of the side walls of the lining 14 of the pot 15 define a working area of rectangular horizontal cross section, the entire area between these walls being clear of obstructions. As will appear more fully hereinafter, the entire working area is usable without the hazard of producing short circuits between the electrodes and of uneven heating of the parts, and thus the furnace may be operated without the necessity for exercising more than routine care in insertion and removal of the parts to be treated.

The illustrative embodiment of the furnace according to the present invention is of the type employing a low voltage, high amperage, single phase, alternating current as the heating medium. The furnace employs a plurality of pairs of spaced alloy steel electrodes of rectangular cross section immersed within the salt bath so that the current flowing between the two electrodes of each pair will flow through the salt bath. To provide for more uniform heating of the salt bath, the series of electrodes may be arranged in a plurality of groups, certain of the groups being located at different levels of the furnace. In the furnace shown, two such groups of pairs of electrodes are employed, the electrodes at the back and right side of the furnace as shown in Fig. 1 terminating approximately midway of the height of the salt bath and being exposed to only the upper portion of the salt bath, whereas the electrodes shown at the front and left sides of the furnace as shown in Fig. 1 are somewhat longer and extend substantially to the bottom of the pot 15, these electrodes being exposed to the interior of the pot for only the lower half of the depth of the pot.

Figure 3:
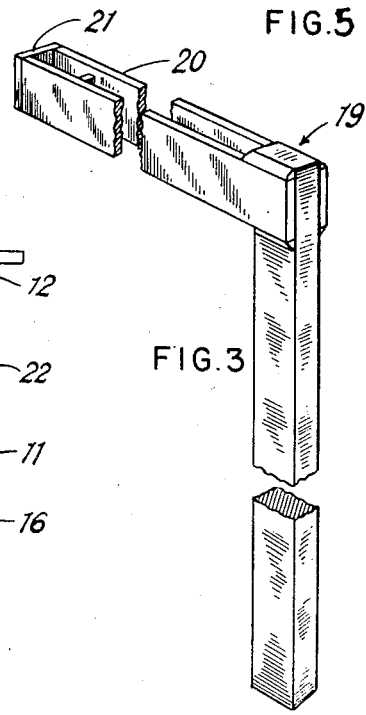
Fig. 3 is a perspective view of one of the electrodes.

Except for the length of the electrodes, the longer electrodes 17 are similar in construction to the shorter electrodes 19, one of the shorter electrodes 19 being shown in Fig. 3. Each electrode has a bus bar 20 secured to the top of the electrode as by welding or otherwise, the bus bar preferably comprising two parallel spaced alloy steel strips connected at the end removed from the electrode 19 by a copper plate 21 to which the lead from the transformer or other power source (not shown) may be connected.

In the embodiment of the invention shown in Figs. 1, 2, and 4, the rear and right sides of the pot lining 14 are provided with a plurality of recesses 22 spaced at equal intervals along the sides of the pot, the recesses extending for only a portion of the depth of the lining 14, being of such vertical length as to be substantially coextensive with the upper half of the salt bath within the furnace and preferably terminating a short distance below the level of the bath in the pot. The recesses 22 are of such size as to receive a pair of spaced, shorter electrodes 19, 19, the recesses preferably being generally rectangular in vertical cross section as indicated in Fig. 4 and receiving the electrodes 19, 19 in the rear corners (those furthest removed from the working area of the pot) of the recesses as indicated in the drawings, the electrodes being substantially removed from the general plane of the side walls defining the pot 15.

The other two walls of the pot 15 are provided with a series of generally similar recesses 24 spaced at equal intervals, the recesses 24 preferably being the same size as the recesses 22 and extending from the midportion to the bottom of the pot 15. A pair of spaced, longer electrodes 17, 17 is received within each recess 24, the electrodes 17, 17 also being located at the corners of the recess 24 removed from the wall of the pot 15.

Preferably, the face towards the pot 15 of at least one of each pair of electrodes 17, 17 and 19, 19 is covered by the refractory lining 14 as indicated in Fig. 4, thus narrowing somewhat the entrance to recesses 22 or 24 and covering this face of the electrode to prevent accidental short circuiting by work introduced within the salt bath. In the second form of the invention shown in Fig. 5, the side towards the pot 15 of both electrodes may be covered by the lining 14, but in either instance the confronting sides of each pair of electrodes are left unobstructed.

Upon the pot being filled with salt bath, the bath will flow into the recesses 22 and 24 and complete the circuit between the pairs of electrodes 17, 17 and 19, 19, the current flowing through the salt bath between the electrodes of each pair. However, inasmuch as the electrodes are substantially removed from the sides of the pot 15, there will be no appreciable flow of current through the salt bath outside of the recesses 22 and 24; and, inasmuch as the recesses are only a small fraction of the width of the pot wall in which they are formed, there is little or no danger of work or fixtures immersed within the salt bath of the pot 15 coming in contact with the electrodes, particularly since preferably the outer face (towards the pot) of at least one of each pair of electrodes 17 or 19 is covered by the lining 14.

Figure 5:
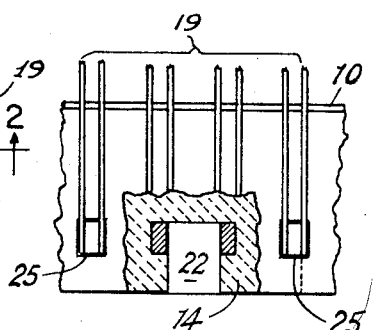
Fig 5 is a view similar to Fig. 4 of a second form of the invention.

Preferably, the electrodes 19 and 17 are introduced into the recesses 22 and 24, respectively, from the top edge of the refractory lining 14 of the pot, the electrodes projecting vertically downward through passages of slightly greater dimensions than the cross section of the electrodes, such as the passages 25 of Figs. 4 and 5 provided for the electrodes 19. Such a construction has the advantage that any of the electrodes may be removed from the furnace when the bath is molten without closing down the furnace or affecting the furnace structure, thus permitting the easy replacement of electrodes as required. In addition, erosion of the electrodes at the surface of the bath is greatly decreased since the salt bath, which will rise within the recesses 22 and 24 due to static pressure of fluid, is not in motion and there is no flow of current between the electrodes except within the recesses. Moreover, this construction obviates the necessity of maintaining a tight seal between the electrodes and furnace lining to prevent escape of molten salt as would be required if the electrodes were introduced through the side of the furnace.

I claim:

1. An electrode type electric salt bath furnace comprising a pot for containing a molten salt bath, said pot having refractory ceramic side walls and bottom defining a working area, the side walls being provided with a plurality of recesses, two spaced passages extending vertically upwardly from each recess to the top edges of said side walls, said passages communicating with portions of the recesses removed from the working area, and an electrode received within each of said passages and projecting from the bottom of the recess to the top edge of the pot wall.

2. An electrode type electric salt bath furnace comprising a pot for containing molten salt bath, said pot having refractory ceramic side walls and bottom defining a working area, the side walls being provided with a plurality of recesses of generally rectangular cross section, two spaced passages extending vertically upwardly from each recess to the top edges of said side walls, said passages being aligned with the two corners of the recesses removed from the working area, an electrode received within each of said passages and projecting from the bottom of the recess to the top edge of the pot wall.

3. An electrode type electric salt bath furnace comprising a pot for containing molten salt bath, said pot having refractory ceramic side walls and bottom defining a working area, the side walls being provided with a plurality of recesses, two spaced passages extending vertically upwardly from each recess to the top edges of said side walls, said passages communicating with portions of the recesses removed from the working area, and an electrode received within each of said passages and projecting from the bottom of the recess to the top edge of the pot wall, the opposed sides of the electrodes within the recesses being exposed and the side towards the working area of at least one of the electrodes being covered by the refractory side walls of the pot.

4. An electrode type electric salt bath furnace comprising a pot for containing molten salt bath, said pot having refractory ceramic side walls and bottom defining a working area, the side walls being provided with a plurality of recesses, two spaced passages extending vertically upwardly from each recess to the top edges of said side walls, said passages communicating with portions of the recesses removed from the working area, and an electrode received within each of said passages and projecting from the bottom of the recess to the top edge of the pot wall, the opposed sides of the electrodes within the recesses being exposed and the side towards the working area of both of the electrodes being covered by the refractory side walls of the pot.

5. An electrode type electric salt bath furnace comprising a refractory ceramic pot for containing a molten salt bath, said pot having generally flat side walls and bottom defining a working area, the side walls being provided with recesses, and a pair of spaced electrodes located within each recess, the electrodes being spaced inwardly of the pot wall from the face thereof.

6. An electrode type electric salt bath furnace comprising a refractory ceramic pot for containing a molten salt bath, said pot having side walls and bottom defining a working area, each side wall being provided with a plurality of recesses, and a pair of spaced electrodes located within each recess, the electrodes being spaced inwardly of the pot wall from the face thereof.

7. An electrode type electric salt bath furnace comprising a refractory ceramic pot for containing a molten salt bath, said pot having generally flat side walls and bottom defining a working area, the side walls being provided with a plurality of recesses, and a pair of vertically extending, spaced electrodes located within each recess, each electrode being spaced inwardly of the pot wall from the face thereof and extending upwardly through the wall of the pot and from the top edge thereof.

8. An electrode type electric salt bath furnace comprising a refractory ceramic pot for containing a molten salt bath, said pot having generally flat side walls and bottom defining a working area, the side walls being provided with a plurality of recesses, and a pair of vertically extending, spaced electrodes located within each recess, each electrode being spaced inwardly of the pot wall from the face thereof and extending upwardly through the wall of the pot and from the top edge thereof, the side towards the working area of at least one electrode of each pair being covered by the refractory wall of the pot.

9. An electrode type electric salt bath furnace comprising a refractory ceramic pot for containing a molten salt bath, said pot having generally flat side walls and bottom defining a working area, the side walls being provided with a plurality of recesses, and a pair of vertically extending, spaced electrodes located within each recess, each electrode being spaced inwardly of the pot wall from the face thereof and extending upwardly through the wall of the pot and from the top edge thereof, the upper ends of the recesses being located below the salt bath level of the pot.

10. An electrode type electric salt bath furnace comprising a refractory ceramic pot for containing a molten salt bath, said pot having generally flat side walls and bottom defining a working area, the side walls being provided with a plurality of recesses, and a pair of vertically extending, spaced electrodes located within each recess, each electrode being spaced inwardly of the pot wall from the face thereof and extending upwardly through the wall of the pot and from the top edge thereof, certain of the recesses being located at a higher level than others of the recesses and the upper ends of the topmost recesses being located below the salt bath level of the pot.

11. An electrode assembly for an electrode type salt bath furnace, said assembly comprising an elongated ferrous alloy electrode member of uniform rectangular cross section throughout its length, a pair of spaced, parallel, ferrous strips welded one to each of two opposite faces of the electrode member so as to project at right angles from an end thereof, the strips being coterminous, and a flat copper plate connecting the ends of the strips removed from the electrode member and lying in a plane generally perpendicular to the length of said strips.

References Cited in the file of this patent

UNITED STATES PATENTS

| Number | Name | Date |
|---|---|---|
| Re. 13,712 | Lachman | Apr. 7, 1914 |
| 929,142 | Ladd | July 27, 1909 |
| 1,655,324 | Miguet | Jan. 3, 1928 |
| 1,811,754 | Hultgren | June 23, 1931 |
| 2,018,883 | Ferguson | Oct. 29, 1935 |
| 2,223,139 | Upton | Nov. 26, 1940 |
| 2,234,476 | Jessop | Mar. 11, 1941 |
| 2,355,761 | Upton | Aug. 15, 1944 |
| 2,367,897 | Smith | Jan. 23, 1945 |
| 2,379,651 | Pritchard | July 3, 1945 |
| 2,415,493 | Holden | Feb. 11, 1947 |
| 2,487,770 | Lepsoe | Nov. 8, 1949 |
| 2,542,637 | De Poy | Feb. 20, 1951 |